(No Model.)
S. J. RAND.
VENT TRAP.
No. 587,681. Patented Aug. 3, 1897.
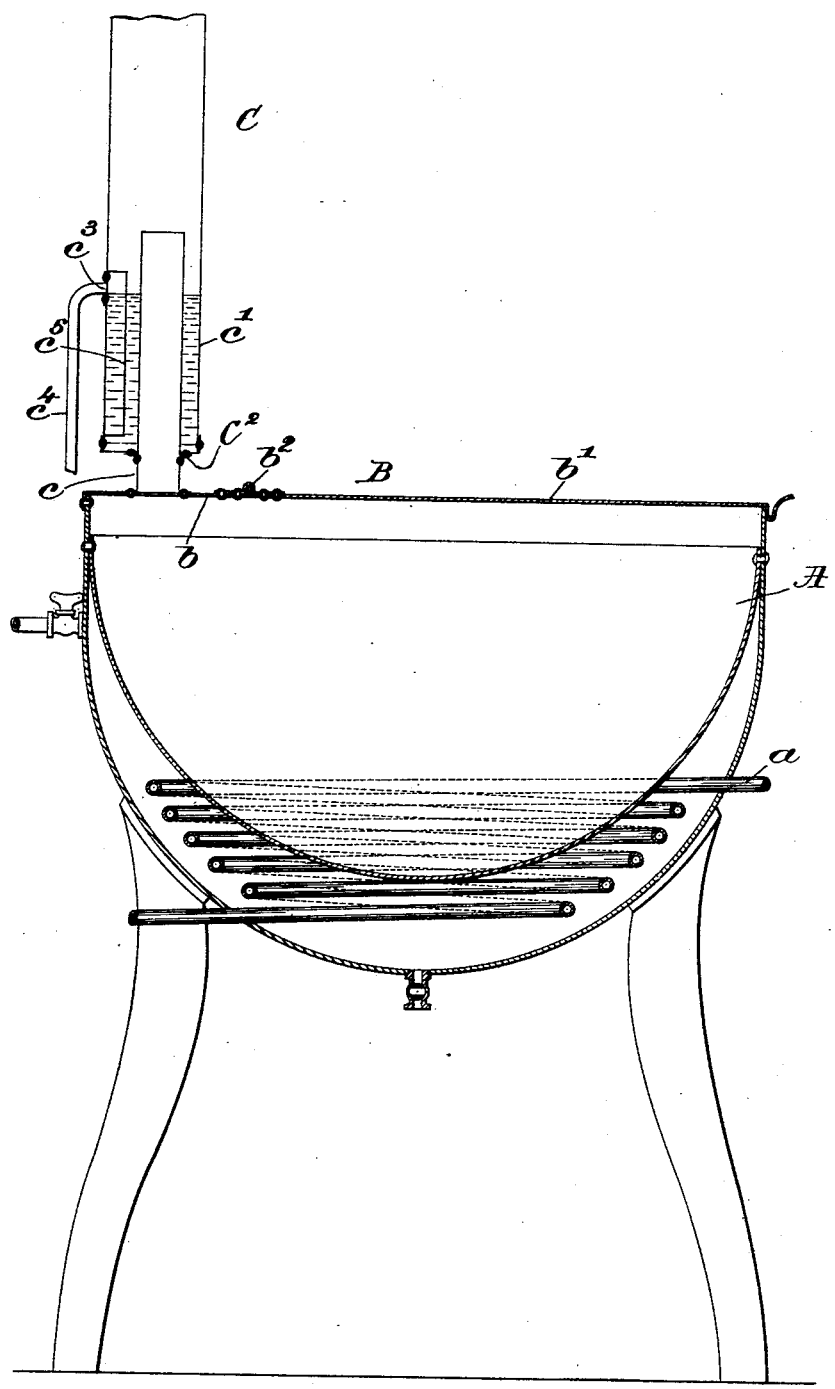
Witnesses.
Fred S. Greenleaf
Edward F. Allen
Inventor
Silas J. Rand
by Crosby & Gregory
Attys.

UNITED STATES PATENT OFFICE.

SILAS J. RAND, OF BOSTON, MASSACHUSETTS, ASSIGNOR OF ONE-HALF TO GEORGE D. BURGESS, OF SAME PLACE.

VENT-TRAP.

SPECIFICATION forming part of Letters Patent No. 587,681, dated August 3, 1897.

Application filed August 2, 1894. Serial No. 519,242. (No model.)

*To all whom it may concern:*

Be it known that I, SILAS J. RAND, of Boston, county of Suffolk, State of Massachusetts, have invented an Improvement in Vent-Traps, of which the following description, in connection with the accompanying drawing, is a specification, like letters on the drawing representing like parts.

In hotels, restaurants, and the like, where large kettles are employed for making soup, &c., it is customary to provide such kettles with vent-pipes leading to the chimney, sewer, or other convenient point to conduct away the steam and vapors rising from the kettle. The steam rising from the kettle condenses to a greater or less extent on contact with the walls of the vent-tube, a part of this condensation adhering to the interior of the tube, the remainder falling back into the kettle, and after a time the collected matter of condensation on the interior of the tube attains a thickness sometimes an eighth of an inch or more, made up of greasy and fatty matter given off while boiling the articles from which the soups are made and frequently containing the germs of disease which must contaminate to a greater or less extent the fresh condensation as the latter runs over it in falling into the kettle. To eliminate this source of disease, I provide a culinary kettle of the class described with a short vent-pipe and lead the same into one end of a larger pipe, which extends to or is connected with a chimney or other escape. So much of the vapors arising from the kettle as do not pass off through this larger pipe are condensed within said pipe and adhere in greater or less quantities to the interior walls of the said larger pipe, and though the same may have collected to a considerable thickness all fresh condensation in flowing down over it is prevented from returning again to the kettle to contaminate the contents thereof, but, on the other hand, is collected in and drawn off from the bottom of the larger pipe, where it can do no harm. In order to provide for the overflow and escape of the matters of condensation, I provide a sewer or escape connection in the larger pipe with an interposed trap.

The drawing, in vertical section, shows a kettle fitted with a vent-tube embodying my invention.

Referring to the drawing, in the particular construction selected to illustrate my invention, A is a kettle, which, so far as my invention is concerned, may be of any shape or construction and heated in any desired manner, the same as herein shown, being heated by a steam-coil $a$ in usual manner. The kettle shown, in common with all kettles of this type, is provided with a cover B, a part $b$ of which is stationary, while the other part $b'$, hinged to it at $b^2$, is made to open for access to the interior of the kettle.

The vent-tube C for the kettle is herein shown as composed of a short inner member or section $c$, leading upwardly from an opening in the fixed part $b$ of the kettle-cover and into the bottom of the larger outer portion $c'$, which latter preferably has a bottom $c^2$, located a short distance above the cover B.

The member $c'$ of the vent-tube leads to a chimney-flue or to any other desired point to conduct away from the kettle such vapors rising therefrom as are not condensed within the tube, the said tube $c'$ near its bottom $c^2$ having preferably a side opening $c^3$, leading to a smaller pipe $c^4$, which may lead to the sewer or other convenient point.

The opening $c^3$, forming the entrance to the pipe $c^4$, is shown inclosed within a jacket $c^5$, closed at its top, but open at its bottom a short distance above the bottom $c^2$ of the outer member $c'$ of the tube.

The arrangement of parts described is such as to form a trap or liquid seal in the bottom of the member $c'$.

The vapors rising from the kettle ascend through the inner member $c$ of the vent-tube, and a part of the same is conducted away through the outer member $c'$ thereof.

A portion of the vapors referred to on coming in contact with the interior wall of the outer member $c'$ is condensed and drops to the bottom of said outer member and there collects until of sufficient depth to overflow into the discharge-tube $c^4$. It will thus be seen that all condensation containing grease and other substances, in which are found the germs of disease, is not permitted to run back again into the kettle, but is collected in the bottom of the outer tube $c'$ and thereafter discharged through the pipe $c^4$, and it matters not how much of the condensation adheres to the interior of the vent-tube member $c'$ the soup or contents of the kettle cannot be contaminated by fresh condensation descending thereover, because such fresh condensation is carried off through the pipe $c^4$.

The liquid seal formed at the bottom of the outer tube effectually prevents gases from the sewer backing up through the pipe $c^4$ and reaching the kettle.

In practice the length of the unprotected portion $c$ of the vent-tube and the depth of the liquid seal will be made as little as possible and operate properly.

My invention is not restricted to the particular construction of device herein shown, for it is evident the essence of my invention may be embodied in other constructions without departing from its scope. Neither is my invention restricted as to its use to any particular kettle or receptacle employed in cooking.

I claim—

The combination with a cooking vessel having a cover, of a short vent-tube rising therefrom, an outlet-pipe, larger in diameter than said vent-tube and through and above the closed lower end of which said vent-tube rises leaving an annular chamber between said vent-tube and outlet-pipe to receive the condensation flowing downwardly within and on the walls of said outlet-pipe, the larger diameter of said outlet-pipe extending throughout the vertical portion thereof which rises directly from said vent-tube to thereby prevent condensation on the inner walls thereof dropping into said vent-tube to contaminate the latter and the contents of the vessel, and a discharge-outlet for said annular chamber, substantially as described.

In testimony whereof I have signed my name to this specification in the presence of two subscribing witnesses.

SILAS J. RAND.

Witnesses:
FREDERICK L. EMERY,
AUGUSTA E. DEAN.